(12) United States Patent
Ron et al.

(10) Patent No.: US 9,510,128 B2
(45) Date of Patent: *Nov. 29, 2016

(54) MOBILE PHONE LOCATOR

(71) Applicant: Google Inc, Mountain View, CA (US)

(72) Inventors: Uri Ron, Kfar Saba (IL); Eyal Bychkov, Hod Hasharon (IL); Itay Sherman, Hod Hasharon (IL); Nataly Kremer, Tel Aviv (IL)

(73) Assignee: Google Inc., Mountain View, CA (US)

(*) Notice: Subject to any disclaimer, the term of this patent is extended or adjusted under 35 U.S.C. 154(b) by 90 days.

This patent is subject to a terminal disclaimer.

(21) Appl. No.: 13/778,155

(22) Filed: Feb. 27, 2013

(65) Prior Publication Data

US 2013/0183955 A1    Jul. 18, 2013

Related U.S. Application Data

(63) Continuation of application No. 12/144,671, filed on Jun. 24, 2008, now Pat. No. 8,412,226.

(51) Int. Cl.
| | |
|---|---|
| *H04B 5/00* | (2006.01) |
| *H04M 3/00* | (2006.01) |
| *H04B 7/00* | (2006.01) |
| *H04B 1/38* | (2015.01) |
| *H04W 4/00* | (2009.01) |
| *H04M 1/725* | (2006.01) |
| *H04M 19/04* | (2006.01) |

(52) U.S. Cl.
CPC ......... *H04W 4/001* (2013.01); *H04M 1/72572* (2013.01); *H04M 19/04* (2013.01)

(58) Field of Classification Search
CPC ..... H04W 8/245; H04W 4/06; H04W 64/00; H04M 1/72525; H04M 1/72522
USPC ............ 455/41, 418, 456.1, 524, 567, 41.1; 340/10.1, 539.13, 901; 370/328
See application file for complete search history.

(56) References Cited

U.S. PATENT DOCUMENTS

| | | |
|---|---|---|
| 4,969,180 A | 11/1990 | Watterson et al. |
| 5,313,557 A | 5/1994 | Osterhout |
| 5,381,086 A | 1/1995 | Aslan |
| 5,418,448 A | 5/1995 | Aslan |
| 5,625,673 A | 4/1997 | Grewe et al. |

(Continued)

FOREIGN PATENT DOCUMENTS

| | | |
|---|---|---|
| EP | 1871075 A1 | 12/2007 |
| WO | 9421058 A1 | 9/1994 |

(Continued)

OTHER PUBLICATIONS

Helleseth, H., Wi-Fi Security, How to Break and Exploit, Thesis for the degree Master of Science, Department of Informatics, University of Bergen, Jun. 2006.

(Continued)

*Primary Examiner* — William D Cumming
(74) *Attorney, Agent, or Firm* — Wolfe-SBMC

(57) ABSTRACT

A mobile phone, including a protocol sniffer for capturing a beacon from a wireless access point, a beacon parser, coupled with the protocol sniffer, for identifying an alert request within the captured beacon, and at least one speaker, coupled with the beacon parser, for sounding an audible alert in response to the beacon parser identifying the alert request.

20 Claims, 2 Drawing Sheets

(56) References Cited

U.S. PATENT DOCUMENTS

| | | | |
|---|---|---|---|
| 5,628,055 A | 5/1997 | Stein | |
| 5,729,213 A * | 3/1998 | Ferrari | B61L 29/246 246/122 R |
| 5,758,280 A | 5/1998 | Kimura | |
| 5,809,115 A | 9/1998 | Inkinen | |
| 5,890,016 A | 3/1999 | Tso | |
| 5,893,037 A | 4/1999 | Reele et al. | |
| 5,898,758 A | 4/1999 | Rosenberg | |
| 5,907,815 A | 5/1999 | Grimm et al. | |
| 5,913,227 A | 6/1999 | Raz et al. | |
| 5,928,367 A | 7/1999 | Nelson et al. | |
| 5,983,073 A | 11/1999 | Ditzik | |
| 6,029,074 A | 2/2000 | Irvin | |
| 6,158,884 A | 12/2000 | Lebby et al. | |
| 6,188,917 B1 | 2/2001 | Laureanti | |
| 6,195,562 B1 | 2/2001 | Pirhonen et al. | |
| 6,201,867 B1 | 3/2001 | Koike | |
| 6,209,011 B1 | 3/2001 | Vong et al. | |
| 6,212,414 B1 | 4/2001 | Alameh et al. | |
| 6,224,254 B1 | 5/2001 | Hayek et al. | |
| 6,236,969 B1 | 5/2001 | Ruppert et al. | |
| 6,243,578 B1 | 6/2001 | Koike | |
| 6,263,218 B1 | 7/2001 | Kita | |
| 6,272,359 B1 | 8/2001 | Kivela et al. | |
| 6,307,348 B1 | 10/2001 | Green | |
| 6,477,357 B1 | 11/2002 | Cook | |
| 6,516,202 B1 | 2/2003 | Hawkins et al. | |
| 6,553,567 B1 | 4/2003 | Wugofski et al. | |
| 6,565,608 B1 | 5/2003 | Fein et al. | |
| 6,594,370 B1 | 7/2003 | Anderson | |
| 6,600,929 B1 | 7/2003 | Toncich et al. | |
| 6,640,113 B1 | 10/2003 | Shin et al. | |
| 6,665,802 B1 | 12/2003 | Ober | |
| 6,690,947 B1 | 2/2004 | Tom | |
| 6,694,125 B2 | 2/2004 | White et al. | |
| 6,696,941 B2 | 2/2004 | Baker | |
| 6,751,474 B1 | 6/2004 | Lin et al. | |
| 6,757,551 B2 | 6/2004 | Newman et al. | |
| 6,760,600 B2 | 7/2004 | Nickum | |
| 6,775,206 B2 | 8/2004 | Karhu | |
| 6,778,436 B2 | 8/2004 | Piau et al. | |
| 6,882,870 B2 | 4/2005 | Kivela et al. | |
| 6,888,202 B2 | 5/2005 | Kang et al. | |
| 6,898,283 B2 | 5/2005 | Wycherley et al. | |
| 6,901,245 B1 | 5/2005 | Boyle | |
| 6,907,264 B1 | 6/2005 | Sterkel | |
| 6,912,287 B1 | 6/2005 | Fukumoto et al. | |
| 6,952,181 B2 | 10/2005 | Karr et al. | |
| 6,957,049 B1 | 10/2005 | Takeda | |
| 6,968,394 B1 | 11/2005 | El-Rafie | |
| 6,978,160 B2 | 12/2005 | Hutchison et al. | |
| 6,983,244 B2 | 1/2006 | Junqua et al. | |
| 6,999,792 B2 | 2/2006 | Warren | |
| 7,016,481 B2 | 3/2006 | McElvaney | |
| 7,016,707 B2 | 3/2006 | Fujisawa et al. | |
| 7,031,692 B1 | 4/2006 | Zanzi | |
| 7,076,272 B2 | 7/2006 | Ikeda et al. | |
| 7,085,542 B2 | 8/2006 | Dietrich et al. | |
| 7,089,035 B2 | 8/2006 | Ando et al. | |
| 7,103,380 B1 | 9/2006 | Ditzik | |
| 7,127,053 B1 | 10/2006 | Laljiani | |
| 7,130,664 B1 | 10/2006 | Williams | |
| 7,146,139 B2 | 12/2006 | Nevermann | |
| 7,155,745 B2 | 12/2006 | Shin et al. | |
| 7,194,285 B2 | 3/2007 | Tom | |
| 7,200,416 B2 | 4/2007 | Aisenberg | |
| 7,215,980 B2 | 5/2007 | Chai et al. | |
| 7,231,181 B2 | 6/2007 | Kohli et al. | |
| 7,233,809 B2 | 6/2007 | Kanevsky et al. | |
| 7,242,963 B1 | 7/2007 | Karstens et al. | |
| 7,266,391 B2 | 9/2007 | Warren | |
| 7,308,272 B1 | 12/2007 | Wortham | |
| 7,311,551 B1 | 12/2007 | Krula | |
| 7,313,423 B2 | 12/2007 | Griffin et al. | |
| 7,373,179 B2 | 5/2008 | Stine et al. | |
| 7,383,061 B1 | 6/2008 | Hawkins | |
| 7,383,362 B2 | 6/2008 | Yu et al. | |
| 7,395,313 B2 | 7/2008 | Ketola | |
| 7,428,429 B2 | 9/2008 | Gantz et al. | |
| 7,450,461 B2 | 11/2008 | Kotani et al. | |
| 7,477,919 B2 | 1/2009 | Warren | |
| 7,499,722 B2 | 3/2009 | McDowell et al. | |
| 7,499,729 B2 | 3/2009 | Lie et al. | |
| 7,509,094 B2 | 3/2009 | Moran et al. | |
| 7,512,402 B2 | 3/2009 | Narayanaswami et al. | |
| 7,515,937 B2 | 4/2009 | Lee | |
| 7,555,264 B2 | 6/2009 | Ishiwata et al. | |
| 7,596,666 B2 | 9/2009 | Ahn et al. | |
| 7,623,892 B2 | 11/2009 | Hawkins | |
| 7,706,850 B2 | 4/2010 | Parivash | |
| 7,739,738 B1 | 6/2010 | Sobel et al. | |
| 7,742,787 B2 | 6/2010 | Nghiem et al. | |
| 7,746,409 B2 | 6/2010 | Okamoto et al. | |
| 7,774,027 B2 | 8/2010 | Parikh et al. | |
| 7,783,318 B2 | 8/2010 | Wilson et al. | |
| 7,787,405 B2 | 8/2010 | Dettinger et al. | |
| 7,813,697 B2 | 10/2010 | McKillop | |
| 7,814,304 B2 | 10/2010 | Cornwell et al. | |
| 7,827,337 B2 | 11/2010 | Jeong | |
| 7,835,827 B2 * | 11/2010 | Peed | G08G 5/0013 701/16 |
| 7,873,385 B2 | 1/2011 | Boireau et al. | |
| 7,890,947 B2 | 2/2011 | Toyoshima | |
| 7,953,455 B2 | 5/2011 | Moran et al. | |
| 7,970,433 B2 | 6/2011 | Sherman et al. | |
| 7,971,046 B2 | 6/2011 | Moran et al. | |
| 8,058,988 B1 * | 11/2011 | Medina | G08B 21/0238 340/539.1 |
| 8,063,888 B2 * | 11/2011 | McFarlane | G06F 3/0421 178/18.01 |
| 8,069,282 B2 | 11/2011 | Sherman et al. | |
| 8,180,395 B2 | 5/2012 | Moran et al. | |
| 8,238,961 B2 | 8/2012 | Bychkov et al. | |
| 8,260,348 B2 | 9/2012 | Sherman | |
| 8,327,124 B2 | 12/2012 | Sherman et al. | |
| 8,356,062 B2 | 1/2013 | Shinohara et al. | |
| 8,391,921 B2 | 3/2013 | Moran et al. | |
| 8,406,814 B2 | 3/2013 | Bychkov et al. | |
| 8,412,226 B2 * | 4/2013 | Ron | H04M 1/72572 340/539.1 |
| 8,750,928 B2 | 6/2014 | Moran et al. | |
| 8,750,936 B2 | 6/2014 | Bychkov et al. | |
| 8,755,846 B2 | 6/2014 | Moran et al. | |
| 8,811,363 B2 * | 8/2014 | Velasco | H04L 12/1403 370/338 |
| 8,850,086 B2 | 9/2014 | Sherman et al. | |
| 8,892,164 B2 | 11/2014 | Sherman | |
| 9,288,292 B2 | 3/2016 | Bychkov et al. | |
| 2002/0075189 A1 | 6/2002 | Carillo et al. | |
| 2002/0090980 A1 | 7/2002 | Wilcox et al. | |
| 2002/0151327 A1 | 10/2002 | Levitt | |
| 2002/0183004 A1 * | 12/2002 | Fulton | H04W 4/06 455/41.1 |
| 2003/0078036 A1 | 4/2003 | Chang et al. | |
| 2003/0084287 A1 | 5/2003 | Wang et al. | |
| 2003/0115930 A1 | 6/2003 | Kappi et al. | |
| 2003/0191818 A1 * | 10/2003 | Rankin | H04L 67/303 709/219 |
| 2003/0214780 A1 | 11/2003 | Oh-Yang et al. | |
| 2003/0228875 A1 | 12/2003 | Alapuranen | |
| 2004/0057578 A1 | 3/2004 | Brewer | |
| 2004/0063475 A1 | 4/2004 | Weng | |
| 2004/0068653 A1 * | 4/2004 | Fascenda | H04L 9/0844 713/168 |
| 2004/0233930 A1 | 11/2004 | Colby, Jr. | |
| 2004/0236997 A1 | 11/2004 | Poo | |
| 2004/0248623 A1 | 12/2004 | Nelson et al. | |
| 2004/0266424 A1 | 12/2004 | Park et al. | |
| 2004/0268005 A1 | 12/2004 | Dickie | |
| 2005/0059429 A1 | 3/2005 | Liu et al. | |
| 2005/0070225 A1 | 3/2005 | Lee | |
| 2005/0124305 A1 | 6/2005 | Stichelbout | |
| 2005/0141700 A1 | 6/2005 | Takeda et al. | |
| 2005/0150122 A1 | 7/2005 | Cho et al. | |

(56) References Cited

U.S. PATENT DOCUMENTS

| | | |
|---|---|---|
| 2005/0150697 A1 | 7/2005 | Altman et al. |
| 2005/0159184 A1 | 7/2005 | Kerner et al. |
| 2005/0207599 A1 | 9/2005 | Fukumoto et al. |
| 2005/0228980 A1 | 10/2005 | Brokish et al. |
| 2005/0233749 A1 | 10/2005 | Karaoguz et al. |
| 2005/0239404 A1 | 10/2005 | Karabinis |
| 2006/0003804 A1 | 1/2006 | Liu |
| 2006/0025158 A1 | 2/2006 | Leblanc et al. |
| 2006/0035663 A1 | 2/2006 | Cheng |
| 2006/0056446 A1 | 3/2006 | Lee et al. |
| 2006/0078122 A1* | 4/2006 | Dacosta ............. H04L 63/0492 380/258 |
| 2006/0094481 A1 | 5/2006 | Gullickson |
| 2006/0105722 A1 | 5/2006 | Kumar |
| 2006/0116113 A1 | 6/2006 | Gass |
| 2006/0128376 A1 | 6/2006 | Alexis |
| 2006/0154688 A1 | 7/2006 | Chai et al. |
| 2006/0163493 A1 | 7/2006 | Antanouski |
| 2006/0190321 A1 | 8/2006 | Martins Nicho et al. |
| 2006/0200843 A1* | 9/2006 | Morgan ............ H04L 29/12009 725/80 |
| 2006/0209809 A1 | 9/2006 | Ellingham et al. |
| 2006/0241353 A1 | 10/2006 | Makino et al. |
| 2006/0245585 A1 | 11/2006 | Yin et al. |
| 2006/0271678 A1* | 11/2006 | Jessup ................... G06F 1/3203 709/224 |
| 2006/0273914 A1 | 12/2006 | Carreras et al. |
| 2007/0004446 A1 | 1/2007 | Moran et al. |
| 2007/0004450 A1 | 1/2007 | Parikh |
| 2007/0008582 A1 | 1/2007 | Cheng |
| 2007/0018957 A1 | 1/2007 | Seo |
| 2007/0072620 A1* | 3/2007 | Levitan ...................... 455/456.1 |
| 2007/0073868 A1* | 3/2007 | Nelson ............... H04L 63/0823 709/224 |
| 2007/0077924 A1 | 4/2007 | Bhogal et al. |
| 2007/0079030 A1 | 4/2007 | Okuley et al. |
| 2007/0085743 A1 | 4/2007 | Eberhardt et al. |
| 2007/0105572 A1 | 5/2007 | Kim |
| 2007/0115180 A1* | 5/2007 | Kish ...................... H01Q 21/29 343/700 MS |
| 2007/0124536 A1 | 5/2007 | Carper |
| 2007/0145152 A1 | 6/2007 | Jogand-Coulomb et al. |
| 2007/0149240 A1* | 6/2007 | Brok ...................... H04W 64/00 455/524 |
| 2007/0161404 A1 | 7/2007 | Yasujima et al. |
| 2007/0167167 A1 | 7/2007 | Jiang |
| 2007/0168652 A1 | 7/2007 | Mylly et al. |
| 2007/0175994 A1 | 8/2007 | Fruhauf |
| 2007/0197266 A1 | 8/2007 | Chang |
| 2007/0232233 A1 | 10/2007 | Liu et al. |
| 2007/0233955 A1 | 10/2007 | Luo et al. |
| 2007/0241261 A1 | 10/2007 | Wendt |
| 2007/0263811 A1 | 11/2007 | Lin et al. |
| 2007/0282471 A1 | 12/2007 | Lee |
| 2007/0285326 A1 | 12/2007 | McKinzie |
| 2007/0288583 A1 | 12/2007 | Rensin et al. |
| 2008/0008142 A1 | 1/2008 | Aldaz et al. |
| 2008/0009325 A1 | 1/2008 | Zinn et al. |
| 2008/0026794 A1 | 1/2008 | Warren |
| 2008/0031201 A1 | 2/2008 | Lee |
| 2008/0040354 A1 | 2/2008 | Ray et al. |
| 2008/0063193 A1 | 3/2008 | Nishioka |
| 2008/0070501 A1 | 3/2008 | Wyld |
| 2008/0076437 A1 | 3/2008 | Wilson et al. |
| 2008/0125189 A1 | 5/2008 | Tomoda |
| 2008/0130604 A1 | 6/2008 | Boyd |
| 2008/0140886 A1 | 6/2008 | Izutsu |
| 2008/0186162 A1 | 8/2008 | Rajan et al. |
| 2008/0198138 A1* | 8/2008 | McFarlane ............ G06F 3/0421 345/173 |
| 2008/0205379 A1 | 8/2008 | Naqvi |
| 2008/0279359 A1 | 11/2008 | Tiliks et al. |
| 2008/0305833 A1 | 12/2008 | Sherman et al. |
| 2008/0312780 A1* | 12/2008 | Peed ..................... G08G 5/0013 701/9 |
| 2009/0009478 A1 | 1/2009 | Badali et al. |
| 2009/0011794 A1 | 1/2009 | Seo |
| 2009/0033487 A1 | 2/2009 | McFadden et al. |
| 2009/0043963 A1 | 2/2009 | Lahcanski et al. |
| 2009/0088151 A1 | 4/2009 | Karabinis |
| 2009/0109897 A1* | 4/2009 | Woo ................ H04L 41/0806 370/328 |
| 2009/0147758 A1 | 6/2009 | Kumar |
| 2009/0167678 A1 | 7/2009 | Orr et al. |
| 2009/0176528 A1 | 7/2009 | Moran et al. |
| 2009/0177884 A1 | 7/2009 | Bieh et al. |
| 2009/0239470 A1 | 9/2009 | Sherman |
| 2009/0243397 A1 | 10/2009 | Cook |
| 2009/0318197 A1* | 12/2009 | Ron .................. H04M 1/72572 455/567 |
| 2010/0006764 A1 | 1/2010 | Bushberg |
| 2010/0013714 A1 | 1/2010 | Azhari |
| 2010/0013730 A1 | 1/2010 | Azhari |
| 2010/0033397 A1 | 2/2010 | Narasimhan et al. |
| 2010/0056210 A1 | 3/2010 | Bychkov et al. |
| 2010/0061431 A1 | 3/2010 | Jyrkka et al. |
| 2010/0075704 A1 | 3/2010 | McHenry et al. |
| 2010/0081402 A1 | 4/2010 | Itkin et al. |
| 2010/0093401 A1 | 4/2010 | Moran et al. |
| 2010/0146256 A1 | 6/2010 | Luo et al. |
| 2011/0014951 A1 | 1/2011 | Sherman et al. |
| 2011/0298589 A1* | 12/2011 | McFarlane ............ G06F 3/0421 340/10.1 |
| 2011/0314268 A1 | 12/2011 | Sherman et al. |
| 2012/0231778 A1 | 9/2012 | Chen et al. |
| 2012/0282912 A1 | 11/2012 | Bychkov et al. |
| 2012/0289291 A1 | 11/2012 | Moran et al. |
| 2012/0295614 A1 | 11/2012 | Sherman |
| 2013/0005399 A1 | 1/2013 | Moran et al. |
| 2013/0023246 A9 | 1/2013 | Ellingham et al. |
| 2013/0040702 A1 | 2/2013 | Sherman et al. |
| 2013/0165100 A1 | 6/2013 | Moran et al. |
| 2013/0183929 A1 | 7/2013 | Bychkov et al. |
| 2013/0183955 A1* | 7/2013 | Ron .................. H04M 1/72572 455/418 |
| 2014/0071967 A1* | 3/2014 | Velasco ............ H04L 12/1403 370/338 |
| 2014/0274206 A1 | 9/2014 | Moran et al. |
| 2014/0295911 A1 | 10/2014 | Bychkov et al. |
| 2015/0050959 A1 | 2/2015 | Sherman et al. |
| 2015/0078363 A1 | 3/2015 | Sherman |
| 2015/0237191 A1 | 8/2015 | Moran et al. |
| 2016/0028864 A1 | 1/2016 | Moran et al. |

FOREIGN PATENT DOCUMENTS

| | | |
|---|---|---|
| WO | 0059247 A1 | 10/2000 |
| WO | 0186922 A1 | 11/2001 |
| WO | 03103174 A1 | 12/2003 |
| WO | WO-2006126777 | 11/2006 |
| WO | WO-2009040796 | 4/2009 |
| WO | WO-2009101618 | 8/2009 |

OTHER PUBLICATIONS

"Advisory Action", U.S. Appl. No. 13/612,900, Jan. 14, 2014, 3 pages.

"Final Office Action", U.S. Appl. No. 12/151,079, Nov. 10, 2010, 21 pages.

"Final Office Action", U.S. Appl. No. 13/564,728, Jan. 28, 2013, 25 pages.

"Final Office Action", U.S. Appl. No. 13/564,728, Feb. 6, 2014, 29 pages.

"Final Office Action", U.S. Appl. No. 13/612,900, Oct. 1, 2013, 6 pages.

"Final Office Action", U.S. Appl. No. 14/280,879, Jan. 22, 2015, 10 pages.

"Final Office Action", U.S. Appl. No. 14/540,568, Dec. 3, 2015, 9 pages.

"Mobile Phones", Federal Office of Public Health http://www.bag.admin.ch/themen/strahlung/00053/00673/04265/index.html?lang=en, Feb. 5, 2009, 11 pages.

(56) References Cited

OTHER PUBLICATIONS

"Non-Final Office Action", U.S. Appl. No. 11/380,944, Oct. 16, 2008, 6 pages.
"Non-Final Office Action", U.S. Appl. No. 11/827,525, Dec. 3, 2010, 8 pages.
"Non-Final Office Action", U.S. Appl. No. 12/151,079, Aug. 25, 2010, 17 pages.
"Non-Final Office Action", U.S. Appl. No. 12/151,079, Nov. 22, 2011, 25 pages.
"Non-Final Office Action", U.S. Appl. No. 12/406,327, Dec. 13, 2010, 5 pages.
"Non-Final Office Action", U.S. Appl. No. 12/525,820, Dec. 16, 2011, 11 pages.
"Non-Final Office Action", U.S. Appl. No. 12/876,129, Jul. 15, 2011, 10 pages.
"Non-Final Office Action", U.S. Appl. No. 13/106,863, Oct. 20, 2011, 4 pages.
"Non-Final Office Action", U.S. Appl. No. 13/170,169, Apr. 27, 2012, 6 pages.
"Non-Final Office Action", U.S. Appl. No. 13/471,751, Oct. 22, 2012, 10 pages.
"Non-Final Office Action", U.S. Appl. No. 13/564,728, Jul. 11, 2013, 30 pages.
"Non-Final Office Action", U.S. Appl. No. 13/564,728, Oct. 11, 2012, 19 pages.
"Non-Final Office Action", U.S. Appl. No. 13/607,819, Nov. 8, 2013, 9 pages.
"Non-Final Office Action", U.S. Appl. No. 13/612,900, Feb. 3, 2014, 10 pages.
"Non-Final Office Action", U.S. Appl. No. 13/612,900, Aug. 16, 2013, 13 pages.
"Non-Final Office Action", U.S. Appl. No. 13/761,188, Sep. 10, 2013, 9 pages.
"Non-Final Office Action", U.S. Appl. No. 13/778,145, Jul. 5, 2013, 12 pages.
"Non-Final Office Action", U.S. Appl. No. 14/282,332, Sep. 18, 2014, 6 pages.
"Non-Final Office Action", U.S. Appl. No. 14/283,231, Mar. 23, 2015, 14 pages.
"Non-Final Office Action", U.S. Appl. No. 14/499,273, Jan. 25, 2016, 8 pages.
"Non-Final Office Action", U.S. Appl. No. 14/540,568, Aug. 14, 2015, 10 pages.
"Notice of Allowance", U.S. Appl. No. 11/380,944, Feb. 9, 2009, 7 pages.
"Notice of Allowance ", U.S. Appl. No. 11/380,944, Feb. 9, 2009, 7 pages.
"Notice of Allowance", U.S. Appl. No. 11/827,525, Mar. 3, 2011, 9 pages.
"Notice of Allowance", U.S. Appl. No. 12/151,079, May 8, 2012, 10 pages.
"Notice of Allowance", U.S. Appl. No. 12/406,327, Feb. 4, 2011, 4 pages.
"Notice of Allowance", U.S. Appl. No. 12/525,820, Mar. 6, 2012, 7 pages.
"Notice of Allowance", U.S. Appl. No. 12/552,440, Apr. 3, 2012, 10 pages.
"Notice of Allowance", U.S. Appl. No. 12/876,129, Oct. 17, 2011, 5 pages.
"Notice of Allowance", U.S. Appl. No. 13/106,863, Jun. 13, 2012, 5 pages.
"Notice of Allowance", U.S. Appl. No. 13/170,169, Aug. 8, 2012, 5 pages.
"Notice of Allowance", U.S. Appl. No. 13/471,751, Nov. 2, 2012, 8 pages.
"Notice of Allowance", U.S. Appl. No. 13/553,837, Dec. 10, 2012, 11 pages.
"Notice of Allowance", U.S. Appl. No. 13/564,728, Aug. 4, 2014, 12 pages.
"Notice of Allowance", U.S. Appl. No. 13/607,819, Feb. 10, 2014, 5 pages.
"Notice of Allowance", U.S. Appl. No. 13/612,900, Jun. 2, 2014, 7 pages.
"Notice of Allowance", U.S. Appl. No. 13/761,188, Feb. 4, 2014, 7 pages.
"Notice of Allowance", U.S. Appl. No. 13/778,145, Feb. 14, 2014, 8 pages.
"Notice of Allowance", U.S. Appl. No. 14/282,332, Jan. 14, 2015, 7 pages.
"Notice of Allowance", U.S. Appl. No. 14/283,231, Jun. 26, 2015, 5 pages.
"Notice of Allowance", U.S. Appl. No. 14/283,231, Oct. 27, 2015, 4 pages.
"Restriction Requirement", U.S. Appl. No. 11/380,944, Oct. 2, 2008, 6 pages.
"Restriction Requirement", U.S. Appl. No. 11/827,525, Aug. 17, 2010, 6 pages.
"Restriction Requirement", U.S. Appl. No. 12/151,079, Aug. 4, 2010, 8 pages.
"Restriction Requirement", U.S. Appl. No. 12/552,440, Jan. 5, 2012, 7 pages.
"Restriction Requirement", U.S. Appl. No. 13/553,837, Nov. 5, 2012, 6 pages.
Friedman,"R., Mechanism of short-term ERK activation by electromagnetic fields at mobile phone frequency", Manuscript BJ20061653, BJ Immediate Publication http://www.biochemj.org/bj/405/0559/4050559.pdf, Apr. 25, 2007, 33 pages.
Hondou,, "Passive exposure to mobile phones: enhancement of intensity by reflection", Journal of the Physical Society of Japan, vol. 75, No. 8 Retrieved at: http://www.empt.phys.tohoku.ac.jp/-hondou/JPSJ-75-084801.pdf, Aug. 2006, 5 pages.
Kuhn,"Assessment of the radio-frequency electromagnetic fields induced in the human body from mobile phones user with hands-free kits", Phys. Med. Biol., vol. 54, pp. 5493-5508, Aug. 26, 2009, 16 pages.
"Non-Final Office Action", U.S. Appl. No. 14/803,129, Feb. 2, 2016, 11 pages.
"Non-Final Office Action", U.S. Appl. No. 14/540,568, Apr. 27, 201, 23 pages.
"Non-Final Office Action", U.S. Appl. No. 14/696,438, Feb. 12, 2016, 8 pages.
"Final Office Action", U.S. Appl. No. 14/499,273, Jul. 8, 2016, 9 pages.
"Final Office Action", U.S. Appl. No. 14/540,568, Aug. 26, 2016, 21 pages.
"Notice of Allowance", U.S. Appl. No. 14/696,438, Jul. 26, 2016, 7 pages.

\* cited by examiner

MOBILE PHONE LOCATOR

This application is a continuation of assignee's application U.S. Ser. No. 12/144,671, entitled MOBILE PHONE LOCATOR, filed on Jun. 24, 2008 by Uri Ron, Eyal Bychkov, Itay Sherman and Nataly Kremer.

FIELD OF THE INVENTION

The field of the present invention is mobile phones.

BACKGROUND OF THE INVENTION

A common problem that arises with mobile electronic devices is locating a misplaced device. Cell phones, for example, are notorious for getting lost.

Conventionally there are two types of methods for locating a misplaced phone. One method, used primarily with cordless phones, involves paging the cordless phone from the phone's base station. When paged, the cordless phone generates an audible alert which enables a user to find the phone. This method generally does not apply to cell phones, since although cell phones are paged by operators via base stations, they do not have personal base station paging capability.

Another method for locating a misplaced phone is to call the phone from another phone. The misplaced phone can be tracked by its ringing sound. This method is commonly used for locating cell phones. However, this method does not work if the misplaced phone has been set to an inaudible ring mode, such as a silent or vibrating ring, or to a very low volume ring.

U.S. Patent Application Publication No. 2007/0072620 A1 of Levitan, entitled SYSTEM AND METHOD FOR RECOVERING A LOST OR STOLEN WIRELESS DEVICE, describes use of a location server for storing user-associated location information. U.S. Patent Application No. 2007/0077924 A1 of Bhogal et al., entitled SYSTEM AND METHOD TO LOCATE MOBILE DEVICES HAVING INAUDIBLE SETTINGS, describes remotely adjusting the ring tone volume of a mobile phone, so that the ring tone is audible enough for a user to hear it. According to Bhogal et al., a user calls his misplaced phone from another phone. Upon connection to his misplaced phone, the user has command options to remotely change the misplaced phone's ring tone volume.

SUMMARY OF THE DESCRIPTION

Aspects of the present invention provide a method and system for locating a misplaced phone by sending an alert request message to the phone. The alert request message may be sent as an SMS or MMS message. Alternatively, the alert request message may be sent via Bluetooth or via Wi-Fi. Yet alternatively, the alert request message may be sent via Wireless Application Protocol (WAP) from a mobile phone or from a PDA. Yet alternatively, the alert request message may be sent via a web server.

In response to receipt of the alert request message, the mobile phone sounds an audible alert, irrespective of whether the phone is set to silent, vibrate or audible ring mode. In addition, the phone may display a pre-designated message, such as "Please contact John at 123-456-7890", so that whoever finds the phone knows how to contact its owner. The phone may also play a pre-designated audio or video segment. The phone may also vibrate.

There is thus provided in accordance with an embodiment of the present invention a method for locating a misplaced mobile phone, including receiving, by a mobile phone, a transmitted message, identifying, by the mobile phone, the transmitted message as being an alert request, and in response to the identifying, generating, by the mobile phone, an alert.

There is additionally provided in accordance with an embodiment of the present invention a mobile phone, including a receiver for receiving a transmitted message, a message parser, coupled with the receiver, for identifying the transmitted message as being an alert request, and at least one speaker, coupled with the message parser, for sounding an audible alert, in response to the message parser identifying the alert request.

There is further provided in accordance with an embodiment of the present invention a method for locating a misplaced electronic communication device, including receiving, by an electronic communication device, a transmitted message, identifying, by the electronic communication device, the transmitted message as being an alert request, and in response to the identifying, generating, by the electronic communication device, an alert.

There is yet further provided in accordance with an embodiment of the present invention an electronic communication device, including a receiver for receiving a transmitted message a message parser, coupled with the receiver, for identifying the transmitted message as being an alert request, and at least one speaker, coupled with the message parser, for sounding an audible alert in response to the message parser identifying the alert request.

BRIEF DESCRIPTION OF THE DRAWINGS

The present invention will be more fully understood and appreciated from the following detailed description, taken in conjunction with the drawings in which.

DETAILED DESCRIPTION

Aspects of the present invention relate to locating a misplaced mobile phone.

Figure 1:
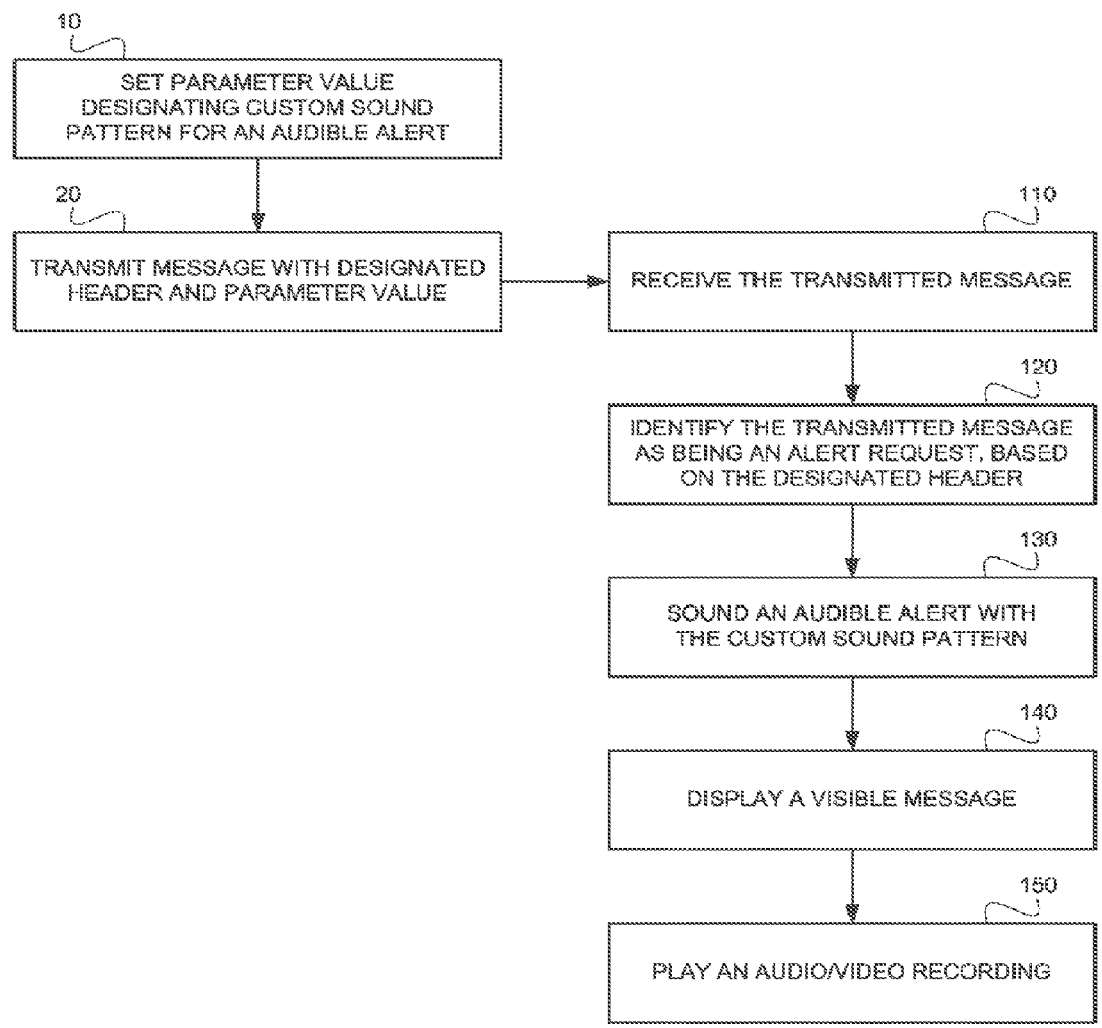
FIG. 1 is a simplified flowchart of a method for locating a misplaced phone, in accordance with an embodiment of the present invention.

Reference is now made to FIG. 1, which is a simplified flowchart of a method for locating a misplace phone, in accordance with an embodiment of the present invention. The method of FIG. 1 is performed by a mobile phone. At step 110 the mobile phone receives a transmitted message. At step 120 the mobile phone parses the transmitted message and identifies the message as being an alert request.

Generally, an alert request includes a recognizable header and one or more parameter values. A user, at step 10, sets the parameter values by means of a message editor, such as message editor 201 (FIG. 2), to specify how the mobile phone responds to an alert request. A sample alert request is "LocateMyPhone <personal identification #><time><volume><alert type>", where the personal identification # parameter is a unique ID for the user, the time parameter designates a time duration for an audible alert, the volume parameter designates a sound volume for an audible alert, and the alert type parameter designates a sound pattern for an audible alert. A sound pattern may be, for example, a repetitive "3 beeps+silence" pattern, or a rising volume alert that starts with an initial volume and increases the volume over time.

If the time parameter is not set, then the audible alert may be sounded for a default amount of time, or alternatively may be sounded until manually stopped. If the volume parameter is not set, then the audible alert may be sounded at a default sound volume. If the alert type parameter is not set, then the alert may be sounded according to a default sound pattern.

If the transmitted message is identified at step 120 as being an alert request, then at step 130 the mobile phone sounds an audible alert. The time, volume and alert type parameters described above govern the audible alert sounded at step 130. In addition, at step 140 the mobile phone displays a visible pre-designated message, such as "Please contact John at 123-456-7890" so that whoever finds the phone knows how to contact its owner. The pre-designated message displayed at step 140 may also be set using a parameter value.

Optionally, at step 150 the mobile phone may play a pre-designated audio/video recording, in addition to or instead of displaying the pre-designated message at step 140. As above, the pre-designated audio/video recording may be set using a parameter value. The pre-designated audio/video recording may indicate that the phone is lost, and describe how to contact the phone's owner.

Optionally, the mobile phone may vibrate, so as to assist people in finding it.

According to various embodiments of the present invention, the transmitted message received at step 110 may be transmitted at step 20, by means of a transmitter such as transmitter 202 (FIG. 2), in a number of different ways. The transmitted message may be transmitted inter alia as an SMS message, or as an MMS message. Use of an MMS message facilitates transmission of a pre-designated audio/video recording.

The transmitted message may be transmitted via Wireless Application Protocol (WAP) from a mobile phone or from a PDA.

The transmitted message may be transmitted via a web server.

The transmitted message may be transmitted over a Bluetooth connection, or over a Wi-Fi connection. For Bluetooth transmission, the transmitted message may be sent as a vCard, which generally includes a message in the name field, from a Bluetooth transmitter to the mobile phone using the Object Exchange (OBEX) protocol. Bluetooth generally has a limited range of approximately 10 meters, for transmissions made by a mobile phone, and has a larger range of up to 200 meters for transmissions made by computers with Class 1 transmitters.

For Wi-Fi transmission, the transmitted message may be included in a data section of an element of an 802.11 IEEE standard beacon. Beacon element ID 221 in the 802.11 standard is a vendor-specific element and, as such, can be used for adding data to the Wi-Fi protocol. In accordance with an embodiment of the present invention, the alert request message may be embedded in the data section of element ID 221, as follows.

| Element ID 221 in 802.11 Beacon | |
|---|---|
| Field | Value |
| Element ID | 221 |
| Length | |
| OUI | Hex vendor code |
| Data | Alert request message |

The field OUI represents a three-octet Organizationally Unique Identifier. For example, the OUI for Microsoft Corporation is 00:50:f2. The OUI is unique for each vendor. It will thus be appreciated by those skilled in the art that for Wi-Fi transmission, step 120 may be performed using an 802.11 protocol sniffer (element 210 of FIG. 2) that captures a beacon from a wireless access point, searches for element ID 221 (element 220 of FIG. 2), and determines whether or not the data field contains an alert request message.

Figure 2:
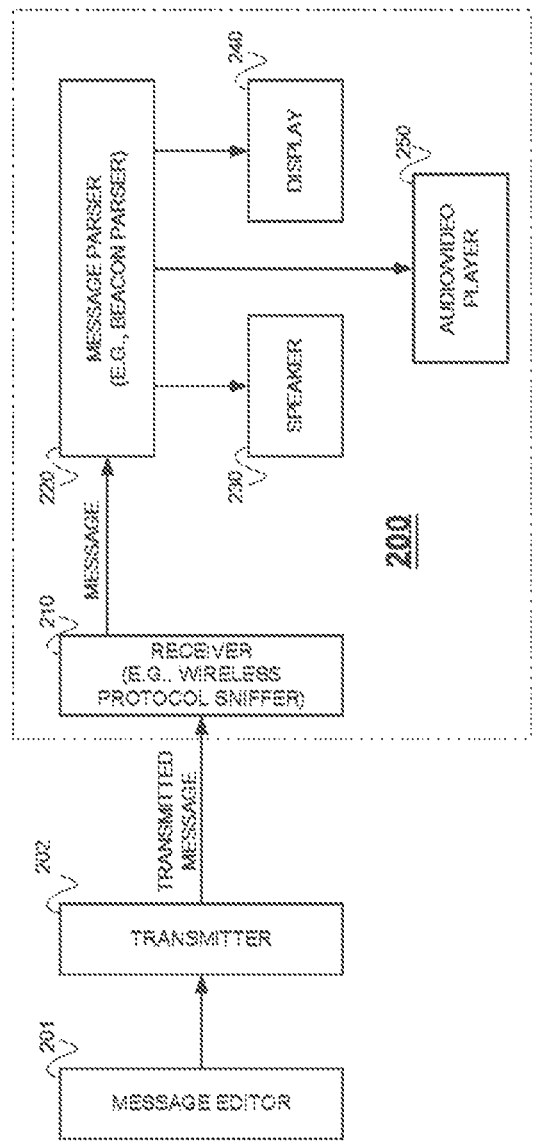
FIG. 2 is a simplified block diagram of a mobile phone with circuitry for generating an alert that aids in locating the phone, in accordance with an embodiment of the present invention.

Reference is now made to FIG. 2, which is a simplified block diagram of a mobile phone 200 with circuitry for generating an alert that aids in locating the phone, in accordance with an embodiment of the present invention. As shown in FIG. 2, mobile phone 200 includes a receiver 210, a message parser 220, at least one speaker 230, a display 240 and an optional audio/video player 250. Receiver 210 receives a transmitted message and forwards the message to message parser 220. Receiver 210 may be inter alia an SMS message receiver or an MMS message receiver. Receiver 210 may be inter alia a Bluetooth receiver or a Wi-Fi receiver.

Message parser 220 receives a message as input, parses the message to determine whether or not the message is an alert request, and generates as output an indicator if the message is an alert request.

Speaker(s) 230 receives as input the indicator from message parser 220 and generates as output an audible alert. As indicated hereinabove, the alert request may include parameter values that govern the time duration, sound volume and sound pattern of the audible alert. Display 240 receives as input the indicator from message parser 220, and generates as output a pre-designated display message. As indicated hereinabove, the pre-designated display message may be a parameter value in the alert request. Audio/video player 250 receives as input the indicator from message parser 220, and generates as output a pre-designated audio/video recording.

In reading the above description, persons skilled in the art will realize that there are many apparent variations that can be applied to the methods and systems described. Thus it may be appreciated from FIGS. 1 and 2 that embodiments of the present invention are not limited to mobile phones, and apply generally to electronic devices that have communication capability, such as portable digital assistants (PDAs) and pagers.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A mobile phone, comprising:
    a Wi-Fi receiver configured to capture a beacon from a wireless access point over a local network;
    a parser, coupled with said Wi-Fi receiver, configured to identify a misplaced phone alert request within the captured beacon, the misplaced phone alert request including at least one user-defined parameter value that specifies a setting for an audible alert; and circuitry coupled with said parser, the circuitry configured to generate the audible the misplaced phone alert in response to identification of the misplaced phone alert request and based on the setting specified by the at least one user-defined parameter value.

2. The mobile phone of claim 1, wherein said parser is configured to search for a vendor-specific element within the captured beacon, and identify the misplaced phone alert request within the vendor-specific element.

3. The mobile phone of claim 1, wherein the circuitry is configured to generate the audible alert for an amount of time specified by the at least one user-defined parameter value.

4. The mobile phone of claim 1, wherein the circuitry is configured to generate the audible alert at a volume specified by the at least one user-defined parameter value.

5. The mobile phone of claim 1, wherein the circuitry is configured to generate the audible alert according to a sound pattern specified by the at least one user-defined parameter value.

6. The mobile phone of claim 1, further comprising a display, coupled with said parser, configured to display a pre-designated image in response to the identification of the misplaced phone alert request.

7. The mobile phone of claim 1, further comprising a light emitter, coupled with said parser, configured to emit light in response to the identification of the misplaced phone alert request.

8. The mobile phone of claim 1, wherein the audible alert includes a vibration of the mobile phone.

9. The mobile phone of claim 1, further comprising an audio player configured to play a pre-designated audio recording in response to the identification of the misplaced phone alert request.

10. The mobile phone of claim 1, further comprising a video player configured to play a pre-designated video recording in response to the identification of the misplaced phone alert request.

11. A method for locating a misplaced mobile phone, comprising:

capturing, by a mobile phone and via a local network, a beacon from a wireless access point;

identifying, by the mobile phone, a request within the captured beacon for a misplace phone alert, the request including at least one user-defined parameter value specifying a setting for the misplaced phone alert; and in response to said identifying, generating, by the mobile phone, the misplaced phone alert using the setting specified by the at least one user-defined parameter value.

12. The method of claim 11, further comprising searching for a vendor-specific element within the captured beacon, and wherein said identifying identifies the request within the vendor-specific element.

13. The method of claim 11, wherein said generating comprises sounding the misplaced phone alert for an amount of time specified by the at least one user-defined parameter value.

14. The method of claim 11, wherein said generating comprises sounding the misplaced phone alert at a volume specified by the at least one user-defined parameter value.

15. The method of claim 11, wherein said generating comprises sounding the misplaced phone alert according to a sound pattern specified by the at least one user-defined parameter value.

16. The method of claim 11, wherein said generating the misplaced phone alert comprises emitting light.

17. The method of claim 11, wherein said generating the misplaced phone alert comprises vibrating the mobile phone.

18. The method of claim 11, further comprising, in response to said identifying, displaying, by the mobile phone, a pre-designated image.

19. The method of claim 11, further comprising, in response to said identifying, playing, by the mobile phone, at least one of a pre-designated audio recording or a pre-designated video recording.

20. The mobile device of claim 1, wherein the circuitry is configured to generate the audible alert by using at least one of a speaker or a vibrator.

* * * * *

UNITED STATES PATENT AND TRADEMARK OFFICE
CERTIFICATE OF CORRECTION

PATENT NO. : 9,510,128 B2  
APPLICATION NO. : 13/778155  
DATED : November 29, 2016  
INVENTOR(S) : Uri Ron et al.

Page 1 of 1

It is certified that error appears in the above-identified patent and that said Letters Patent is hereby corrected as shown below:

In the Claims

Column 5, Line 5, after "audible" before "alert" delete "the misplaced phone"

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*